(12) United States Patent
Lu et al.

(10) Patent No.: US 9,383,990 B2
(45) Date of Patent: Jul. 5, 2016

(54) SERVER AND METHOD FOR ALLOCATING CLIENT DEVICE TO UPDATE FIRMWARE

(71) Applicant: HON HAI PRECISION INDUSTRY CO., LTD., New Taipei (JP)

(72) Inventors: Wen-Pin Lu, New Taipei (TW); Ming-Chen Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/487,797

(22) Filed: Sep. 16, 2014

(65) Prior Publication Data
US 2016/0062759 A1 Mar. 3, 2016

(30) Foreign Application Priority Data
Sep. 3, 2014 (TW) ................. 103130359 A

(51) Int. Cl.
G06F 9/44 (2006.01)
G06F 9/445 (2006.01)
H04L 29/08 (2006.01)
H04L 12/26 (2006.01)

(52) U.S. Cl.
CPC .............. G06F 8/65 (2013.01); H04L 43/0882 (2013.01); H04L 67/1095 (2013.01)

(58) Field of Classification Search
CPC ....................................................... G06F 8/65
USPC ........................................................ 717/172
See application file for complete search history.

(56) References Cited

U.S. PATENT DOCUMENTS

| 7,886,074 | B2 | 2/2011 | England et al. | |
|---|---|---|---|---|
| 2005/0083973 | A1* | 4/2005 | Krishnan | H04J 3/1682 370/468 |
| 2006/0265709 | A1* | 11/2006 | Meaney | G06F 8/63 717/178 |
| 2007/0019574 | A1* | 1/2007 | Huang | H04W 88/08 370/310 |
| 2008/0104681 | A1* | 5/2008 | Lai | H04L 12/4641 726/5 |
| 2008/0281908 | A1* | 11/2008 | McCanne | G06F 17/30156 709/203 |
| 2010/0088448 | A1* | 4/2010 | Min | G06F 9/44521 710/301 |

FOREIGN PATENT DOCUMENTS

| CN | 101074590 A | 3/2010 |
|---|---|---|
| JP | 2002288066 | * 10/2002 |
| TW | I272534 | 2/2007 |

* cited by examiner

*Primary Examiner* — Li B Zhen
*Assistant Examiner* — Sen Chen
(74) *Attorney, Agent, or Firm* — ScienBziP, P.C.

(57) ABSTRACT

A server includes a detecting module, a calculating module, a comparing module, an allocating module and a sorting module. The detecting module is used for receiving firmware version query information from a plurality of client devices. The calculating module is used for calculating bandwidth sum of the CPEs. The comparing module is used for determining whether the calculated total bandwidth is larger than a total downloading bandwidth of the server. The allocating module is used for sequencing the client devices which transmit the firmware download requests to wait for the download. The sorting module is used for scoring each of the client devices which transmit the firmware download requests according to attributes of the client devices which transmit the firmware download requests and sequencing the client devices which transmit the firmware download requests to wait for downloading according to the scores.

4 Claims, 7 Drawing Sheets

| Opcode | Operation |
|---|---|
| 1 | Read Request |
| 2 | Write Request |
| 3 | Data |
| 4 | Acknowledgement |
| 5 | Error |
| 6 | Option Acknowledgement |
| 100 | Download Request |
| 101 | Response |

FIG. 3

| Client | Downlod Times (Min) | Whether Using | Priority Model | Priority Device | Working Time | Score |
|---|---|---|---|---|---|---|
| A | 3 (1) | N | High Level (2) | N (0) | 19:32:40 (4) | 1.4 |
| B | 16 (4) | N | Low Level (1) | N (0) | 5:10:03 (1) | 1.2 |
| C | 27 (5) | Y | Low Level (1) | N (0) | 7:04:16 (2) | 0 |
| D | 9 (2) | N | Low Level (1) | N (0) | 27:53:17 (5) | 1.6 |
| E | 11 (3) | N | High Level (2) | Y (1) | 16:31:45 (3) | 2 | example:

Score (A): 1* (1*0.2+2*0.2+0*0.4+4*0.2) =1.4

Score (B): 1* (4*0.2+1*0.2+0*0.4+1*0.2) =1.2

Score (C): 0* (5*0.2+1*0.2+0*0.4+2*0.2) =0

Score (D): 1* (2*0.2+1*0.2+0*0.4+5*0.2) =1.6

Score (E): 1* (3*0.2+2*0.2+1*0.4+3*0.2) =2.0

The array is E、D、A、B、C

FIG. 6

SERVER AND METHOD FOR ALLOCATING CLIENT DEVICE TO UPDATE FIRMWARE

FIELD

The disclosure generally relates to computer networking, and particularly to a server and a method for allocating client device to update firmware.

BACKGROUND

Customer premise equipment (CPE) is developing rapidly and thus upgrades to the firmware used by CPE is more frequent, so the firmware update speed is especially important.

BRIEF DESCRIPTION OF THE DRAWINGS

Many aspects of a network equipment and method for selecting communication path can be better understood with reference to the following drawings. The components in the drawings are not necessarily drawn to scale, the emphasis instead being placed upon clearly illustrating the principles of the network equipment and the method for selecting communication path. Moreover, in the drawings, like reference numerals designate corresponding parts throughout the several views. Wherever possible, the same reference numbers are used throughout the drawings to refer to the same or like elements of an embodiment.

FIG. 3 is table showing operation codes and corresponding operations.

FIG. 6 is a diagram one embodiment of calculating score of CPEs.

DETAILED DESCRIPTION

Figure 1:
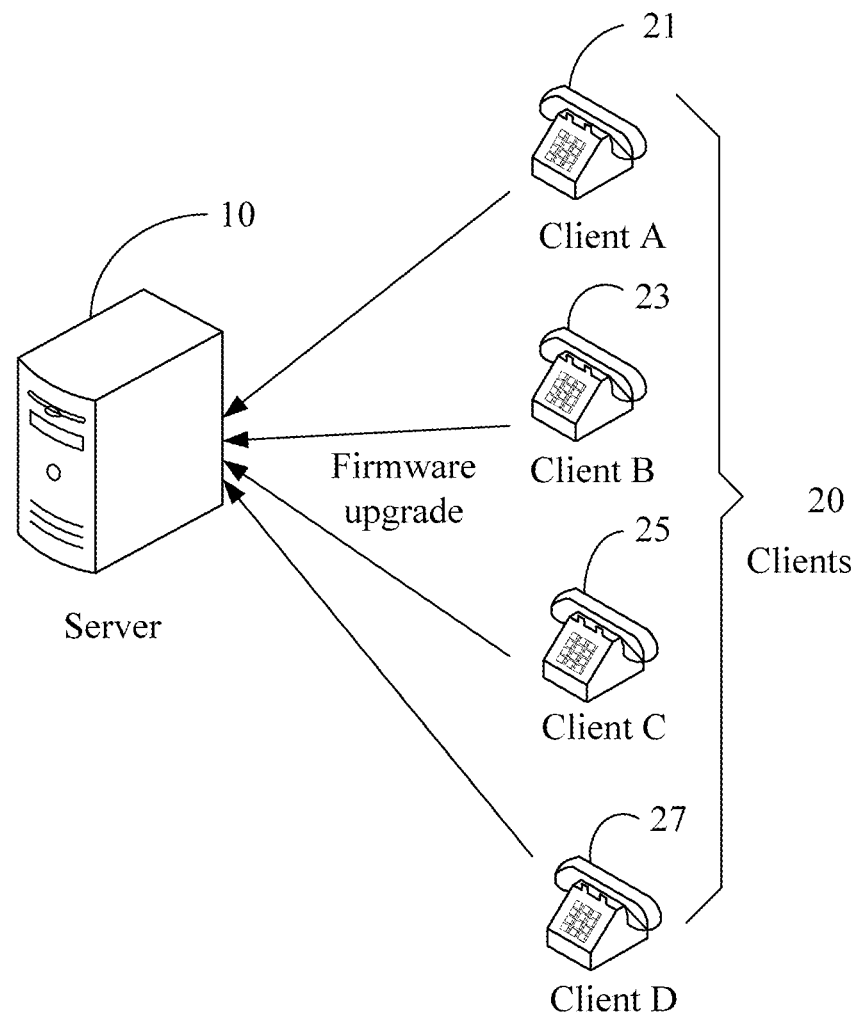
FIG. 1 is a application environment diagram of one embodiment of a server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a server and a method for allocating client device to update firmware.

FIG. 1 is a application environment diagram of one embodiment of a server 10. In one embodiment, the server 10 has various stored firmware versions and is responsible for the management for terminal client (such as fixed telephone). Clients 20 represents one or more client devices, as shown in client A 21, the client B 23, client C 25, the client D 27. In response to the client A 21, the client B 23, the client C 25 and the client D 27 requiring firmware updates, the server 10 receives requests and allocates the clients to update the firmware.

Figure 2:
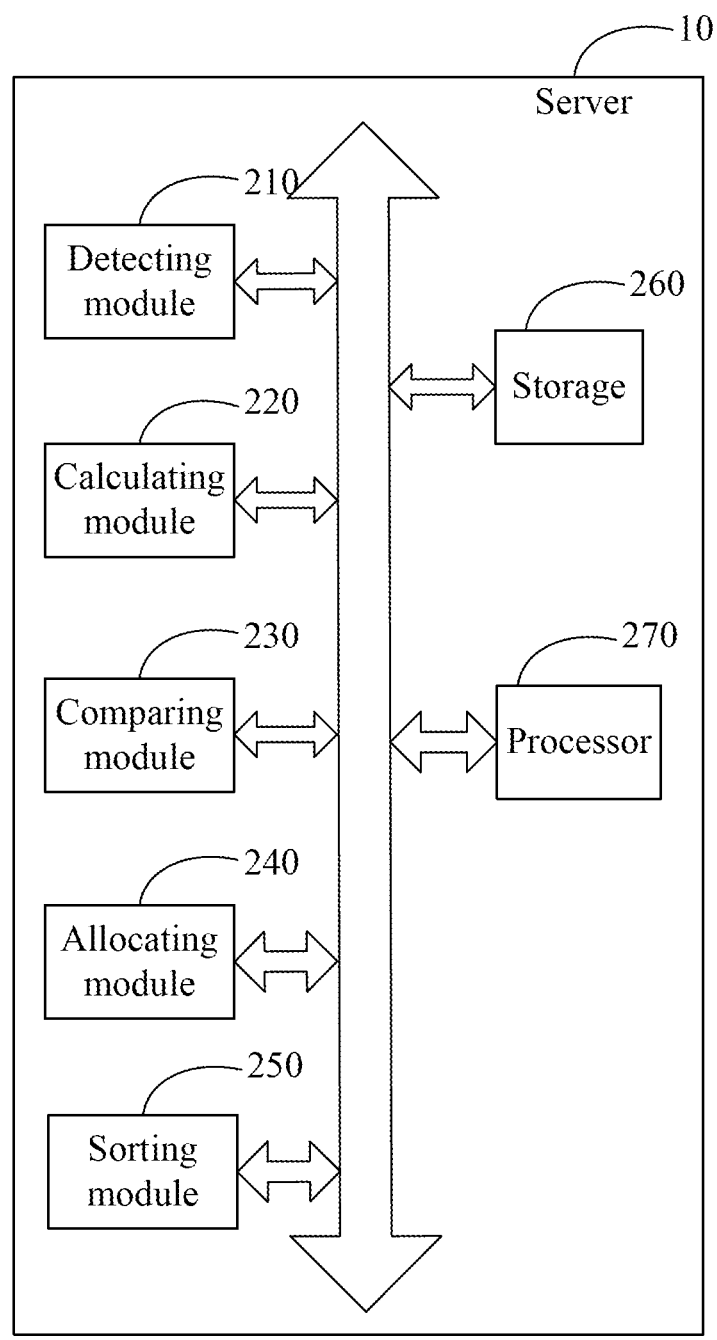
FIG. 2 is a function module diagram of one embodiment of the server of FIG. 1.

FIG. 2 is a function module diagram of one embodiment of the server 10 of FIG. 1. In one embodiment, the server 10 comprises a detecting module 210, a calculating module 220, a comparing module 230, an allocating module 240, a sorting module 250, a storage system 260 and a processor 270. The modules 210, 220, 230, 240, 250 comprise software programs which are stored in the storage system 260, and the processor 270 runs the software programs to achieve functions of the modules 210, 220, 230, 240, 250.

In one embodiment, when the clients 20 (such as client A 21, client B 23, client C 25, the client D 27) require a firmware update and send queries to the server 10 to check the latest firmware version. The detecting module 210 then receives firmware version query information from the clients 20, and transmits the version information of a latest firmware to the clients 20 so that the clients 20 can determine the latest firmware version.

In one embodiment, according to the Trivial File Transfer Protocol (TFTP), the client 20 sends a TFTP request for downloading the firmware to the server 10. In order to facilitate the download request and the response, the client device 20 adds two operation code (opcodes) in the TFTP code area.

FIG. 3 illustrates table of operation codes and corresponding operations. In this table, 100 and 101 are added and separately indicate the download request and response.

In one embodiment, when the clients 20 has determined what the latest firmware version is and when the firmware version of a plurality of clients (such as the client A 21 and the client B 23) are earlier than the latest firmware version, the client A 21 and the client B 23 will send the latest version of the firmware download requests to the server 10. So the calculating module 220 receives the firmware download requests and calculates a total bandwidth of the other devices that are downloading the latest firmware version and the client devices which transmit the firmware download requests. The comparing module 230 then determines whether the calculated total bandwidth is larger than a total downloading bandwidth of the server 10.

When the calculated total bandwidth is not larger than the total downloading bandwidth of the server 10, which means that the total downloading bandwidth of the server 10 is sufficient, the server 10 sends a reply information to the clients 20 which transmit the firmware download requests, the allocating module 240 then transmits the latest firmware to the clients 20 which transmit the firmware download requests.

When the calculated total bandwidth is larger than the total downloading bandwidth of the server 10, which means that the total downloading bandwidth of the server is not enough for the clients 20 firmware to download, the allocating module 240 then sequences the clients 20 which transmit the firmware download requests to wait for the latest firmware to download and sends a reply to the clients 20 which transmits the download requests. After receiving the reply from the allocating module 240, the clients 20 send attributes of the clients 20 which transmit the download requests. The sorting module 250 scores each of the clients 20 which transmit the download requests according to attributes of the clients 20 and sequences the clients 20 which transmit the download requests to wait for downloading according to the scores.

In one embodiment, the attributes of one of the clients 20 comprise a downloading time, a using state, a priority level, a priority state and a work duration. The downloading time is calculated according to a maximum download speed of the one of the client devices which transmits the firmware download requests. The use state indicates whether one of the client devices is in use. The priority state indicates whether one of the client devices is priority equipment or not.

FIG. 6 is a diagram one embodiment of calculating score of CPEs. In this embodiment, the scoring formula: score (S)=the use state*(level of the download time*A+the priority level*B+the priority state*C+level of the work duration*D), wherein A, B, C, and D are preset weights of corresponding attributes. According to the FIG. 6, when in a non working state, the score can be used to determine the priority level of the download. According to the client C, once in use, the score is zero. Furthermore, it is obvious that A=0.2, B=0.2, C=0.4 and D=0.2. High priority levels and low priority level is shown from 2 to 1. When the client is a priority level, then the value is 1, otherwise the value is 0. According to the work duration, the level of the work duration is shown from 1 to 5 based on the least to the longest (the FIG. 6 is 5, is 1-5). According to the above rules, the score of CPEs can be calculated out, and the sorting module 250 can sort the clients 20 which transmit the firmware download requests from high to low, which is shown in the FIG. 6.

Figure 4:
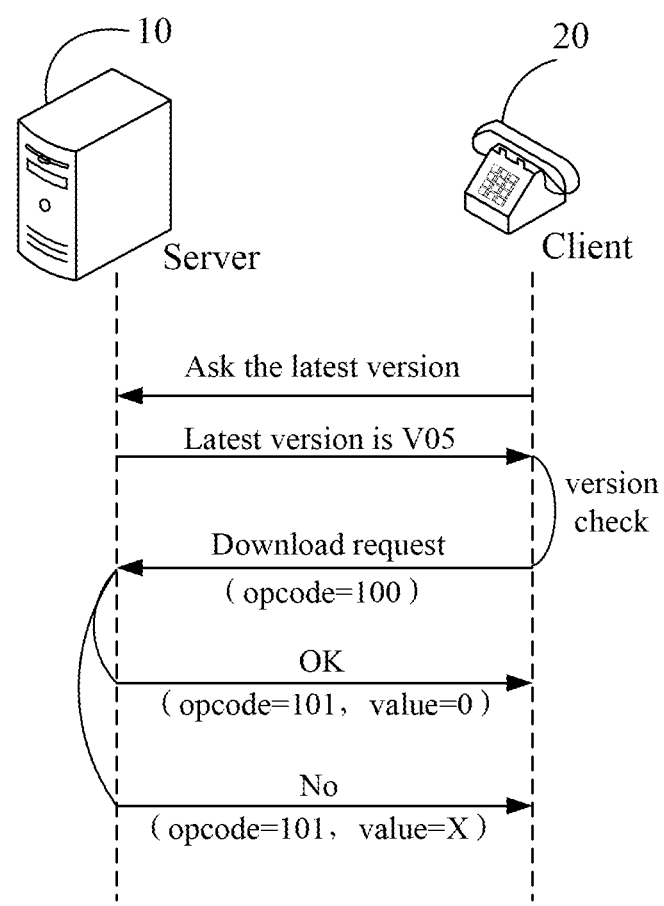
FIG. 4 is a flowchart illustrating one embodiment of a method for a CPE requesting firmware download from the server.

FIG. 4 is a flowchart illustrating one embodiment of a method for a CPE requesting firmware download from the server. In one embodiment, when the client A 21 requires a firmware upgrade, the client A 21 sends a request to the server 10 for the latest firmware version, the server 10 notifies the client A 21 the latest firmware version is V05. The client A 21 then checks own firmware version, and determines the firmware version is not V05, so the firmware version of the client A 21 needs to be updated (of course the firmware may also be the same, so no update, is needed and is not discussed). The client A 21 then will send a download request to the server 10. The server 10 receives the download request, when the total bandwidth is enough, replies OK to the client A 21, and when the total bandwidth is not enough, replies No to the client A 21. It is shown when the reply is Ok, the operation code is 101, value=0, and the reply is No, the operation code is 101, value=X. For specific opcode, the client A 21 sends 0X64 to the server 10, the server 10 replies 0X650X20 to inform the client A 21 to wait 32 seconds.

Figure 5:
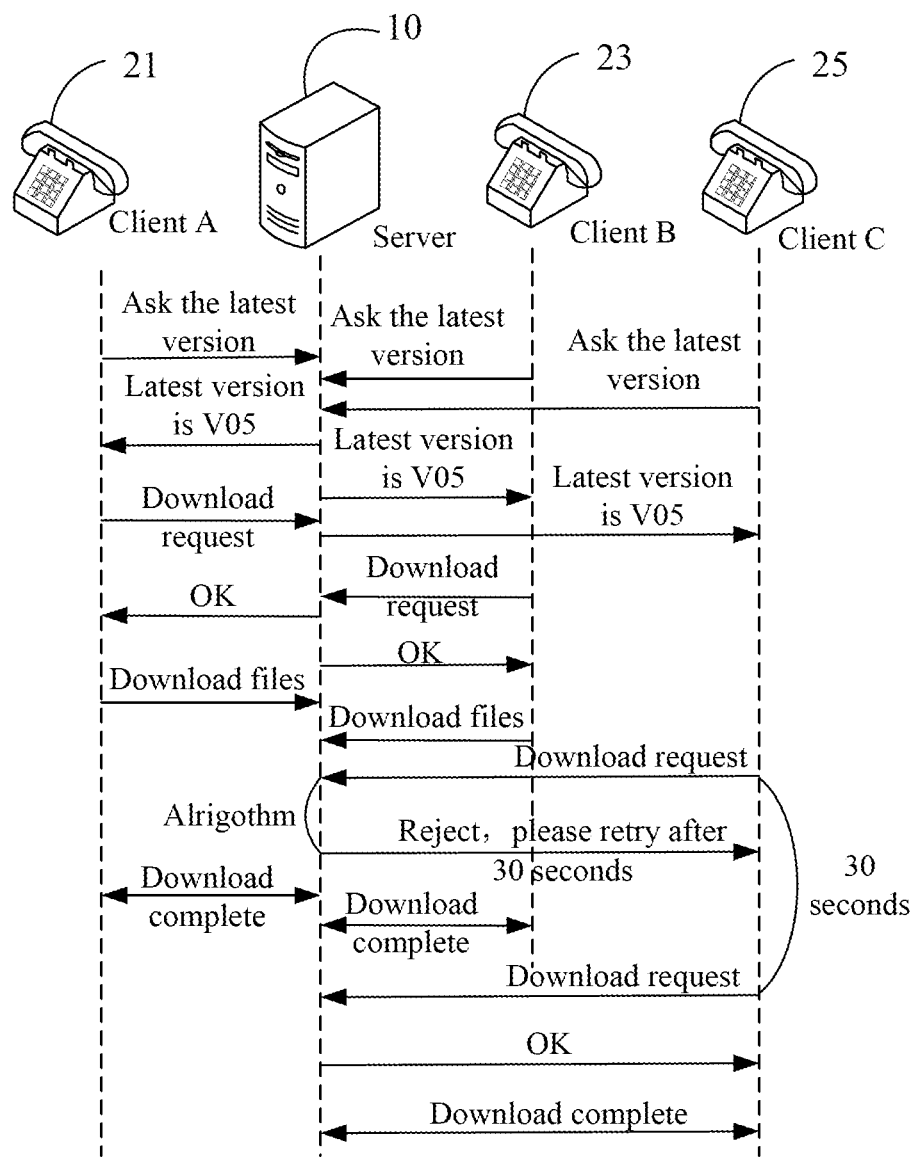
FIG. 5 is a flowchart illustrating one embodiment of a method for multiple CPEs requesting firmware download from a server.

FIG. 5 is a flowchart illustrating one embodiment of a method for multiple CPEs to request firmware download from a server. In one embodiment, the client A 21, the client B 23 and the client C 25 require firmware upgrade. The client A 21, the client B 23 and the client C 25 send requests to the server 10 to request the latest firmware version. the server 10 notifies the client A 21, the client B 23 and the client C 25 of the latest firmware version is V05. After checking own firmware version, the client A 21, the client B 23 and the client C 25 find that all of the clients A 21, B 23 and C 25 need to be updated, and then sends download requests to the server 10. The server then determines whether the total bandwidth of the server 10 is larger than the total downloading bandwidth of the client A 21, the client B 23 and the client C 25. However, if the total bandwidth of the server 10 is not larger than the total downloading bandwidth of the client A 21, the client B 23 and the client C 25, and the client C 25 cannot be allowed to download the firmware. So, the server 10 replies OK to the client A 21 and the client B 23, and replies NO to the client C 25. After the client A 21 and the client B 23 receives the reply, then the firmware is downloaded until completed. After the client C 25 receives the reply, then waits 30 seconds and the download requests are sent again to the server 10, and after the server 10 replies OK, the firmware will be download until completed.

Figure 7:
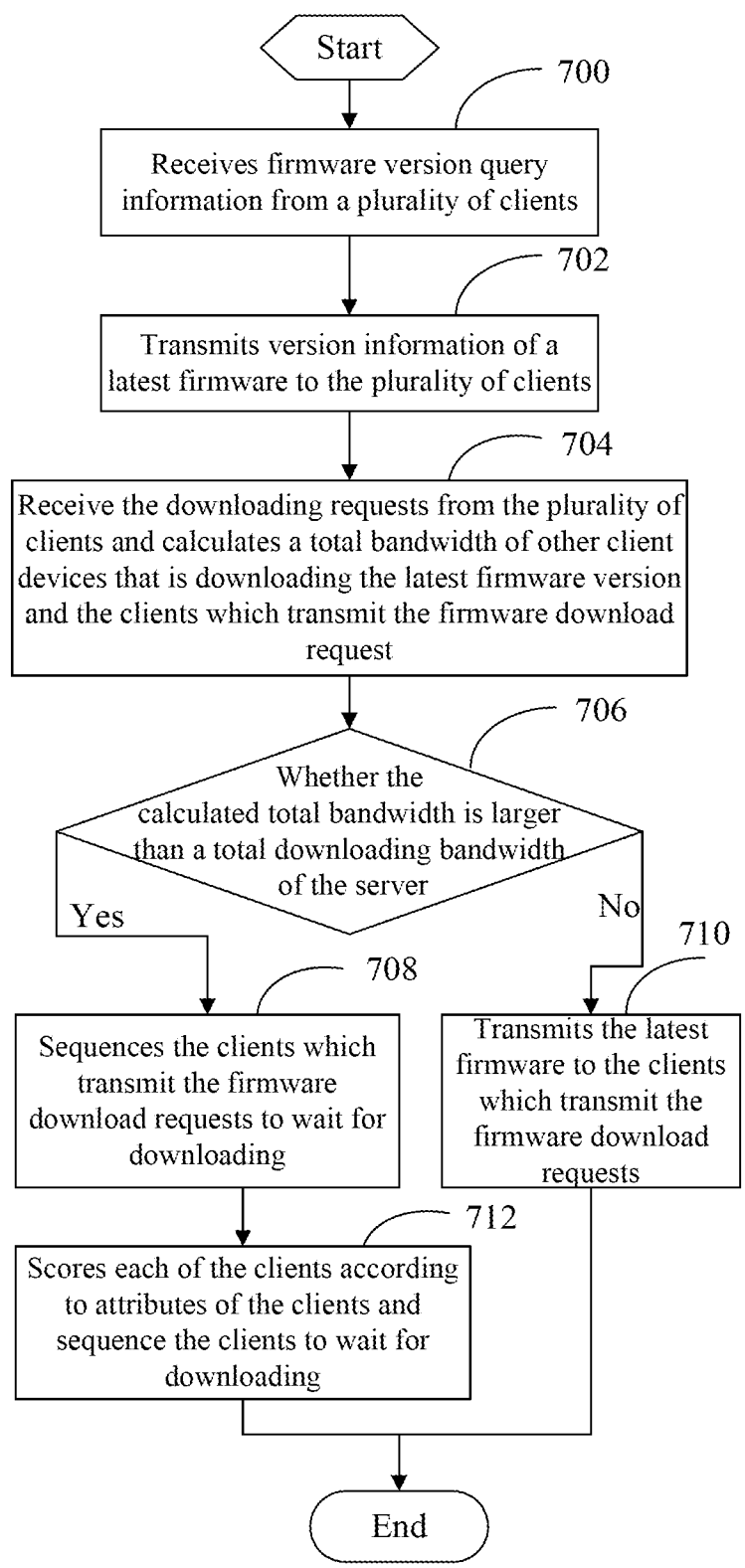
FIG. 7 is a flowchart illustrating one embodiment of a method for a server allocating CPE to updating firmware.

FIG. 7 is a flowchart illustrating one embodiment of a method for a server to allocate CPE to update firmware. This method is used in the server 10 of FIG. 1, and as shown by the function blocks in FIG. 2 in completion, in the present embodiment, FIG. 2 illustrates the functional blocks implementing the method.

In block 700, the detecting module 210 receives firmware version query information from a plurality of clients 20.

In block 702, the detecting module 210 transmits version information of a latest firmware to the plurality of clients 20.

After receiving the version information of a latest firmware, the plurality of clients 20 checks own firmware version, and when the firmware version of the plurality of clients 20 is earlier than the latest firmware version, downloading requests are send to the server 10.

In block 704, the calculating module 220 receives the download requests from the plurality of clients 20, and calculates a total bandwidth of other client devices that is downloading the latest firmware version and the clients 20 which transmit the firmware download request.

In block 706, the comparing module 230 determines whether the calculated total bandwidth is larger than a total download bandwidth of the server 10.

In block 708, the allocating module 240 sequences the clients 20 which transmit the firmware download requests to wait for a download in response to the total bandwidth being larger than the total download bandwidth of the server 10.

In block 710, the allocating module 240 transmits the latest firmware to the clients 20 which transmit the firmware download requests in response to the total bandwidth not being larger than the total downloading bandwidth of the server.

In block 712, the sorting module 250 transmits the scores to each of the clients 20 which transmit the firmware download requests according to attributes of the clients 20 which transmit the firmware download requests, and sequence the clients 20, which transmit the firmware download requests to wait for the download according to the scores.

Furthermore, the attributes of one of the clients 20 comprise a downloading time, a use state, a priority level of the one of the clients 20, a priority state and a download duration of the one of the clients 20. The downloading time is calculated according to a maximum download speed of the one of the client devices which transmits the firmware download requests. The use state indicates if one of the client devices is in use. The priority state indicates whether the one of the client devices is a priority or not. The score=the use state* (level of the download time*A+the priority level*B+the priority state*C+level of the work duration*D), wherein A, B, C, and D are preset weights of the corresponding attributes.

It is to be understood, however, that even though numerous characteristics and advantages of the exemplary disclosure have been set fourth in the foregoing description, together with details of the structure and function of the exemplary disclosure, the disclosure is illustrative only, and changes may be made in detail, especially in matters of shape, size, and arrangement of parts within the principles of this exemplary disclosure to the full extent indicated by the broad general meaning of the terms in which the appended claims are expressed.

What is claimed is:

1. A server, comprising:
   a processor; and
   a storage system, storing one or more software programs in the form of computerized codes operable to be executed by the processor, the one or more software programs comprising instructions for:
      receiving firmware version query information from a plurality of client devices;
      transmitting version information of a latest firmware to the plurality of client devices;
      receiving firmware download requests from some of the plurality of client devices with firmware version earlier than the latest firmware version;
      calculating a total bandwidth of other client devices that is downloading the latest firmware version and the client devices which transmit the firmware download requests;
      determining whether the calculated total bandwidth is larger than a total downloading bandwidth of the server;
      sequencing the client devices which transmit the firmware download requests to wait for downloading in response to the total bandwidth being larger than the total downloading bandwidth of the server;
      scoring to each of the client devices which transmit the firmware download requests according to attributes of the client devices which transmit the firmware download requests;
      sequencing the client devices which transmit the firmware download requests to wait for downloading according to the scores;
      wherein the attributes of the one of the client devices further comprise:
         a using state indicating whether the one of the client devices is in use:
         a downloading time which is calculated according to a maximum download speed of the one of the client devices which transmit the firmware download requests;
         a priority level of the one of the client devices;
         a priority state indicating whether the one of the client devices is a priority equipment or not;
         a work duration of the one of the client devices; and
         the score=the using state * (level of the download time *A+the priority level *B+the priority state *C+level of the work duration *D), wherein A, B, C, and D are preset weights of the corresponding attributes.

2. The server of claim 1, wherein the one or more software programs further comprises instructions for:
   transmitting the latest firmware to the client devices which transmit the firmware download requests in response to the total bandwidth being not larger than the total downloading bandwidth of the server.

3. A method for a server allocating CPE to updated firmware comprising:
   receiving firmware version query information from a plurality of client devices;
   transmitting version information of the latest firmware to the plurality of client devices;
   receiving firmware download requests from some of the plurality of client devices with firmware version earlier than the latest firmware version;
   determining whether the calculated total bandwidth is larger than a total downloading bandwidth of the server;
   sequencing the client devices which transmit the firmware download requests to wait for downloading in response to the total bandwidth being larger than the total downloading bandwidth of the server;
   scoring to each of the client devices which transmit the firmware download requests according to attributes of the client devices which transmit the firmware download requests;
   sequencing the client devices which transmit he firmware download requests to wait for downloading according to the scores;
   wherein the attributes of the one of the client devices further comprise:
      a using state indicating whether the one of the client devices is in use;
      a downloading time which is calculated according to a maximum download speed of the one of the client devices which transmit the firmware download requests;
      a priority level of the one of the client devices;
      a priority state indicating whether the one of the client devices is a priority equipment or not;
      a work duration of the one of the client devices; and
      the score=the using state * (level of the download time *A+the priority level *B+the priority state *C+level of the work duration *D), wherein A, B, C, and D are preset weights of the corresponding attributes.

4. The method for the server allocating CPE to update firmware of claim 3, further comprising:
   transmitting the latest firmware to the client devices which transmit the firmware download requests in response to the total bandwidth being not larger than the total downloading bandwidth of the server.

* * * * *